(12) United States Patent
Han et al.

(10) Patent No.: US 11,855,864 B2
(45) Date of Patent: Dec. 26, 2023

(54) METHOD AND APPARATUS FOR COLLECTING NETWORK TRAFFIC IN WIRELESS COMMUNICATION SYSTEM

(71) Applicant: Samsung Electronics Co., Ltd., Suwon-si (KR)

(72) Inventors: Yoonseon Han, Suwon-si (KR); Jungshin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/758,390

(22) PCT Filed: Dec. 22, 2020

(86) PCT No.: PCT/KR2020/018898
§ 371 (c)(1),
(2) Date: Jul. 5, 2022

(87) PCT Pub. No.: WO2021/141291
PCT Pub. Date: Jul. 15, 2021

(65) Prior Publication Data
US 2023/0035778 A1 Feb. 2, 2023

(30) Foreign Application Priority Data

Jan. 6, 2020 (KR) .................. 10-2020-0001575

(51) Int. Cl.
*H04L 43/062* (2022.01)
*H04L 47/2483* (2022.01)

(52) U.S. Cl.
CPC ........ *H04L 43/062* (2013.01); *H04L 47/2483* (2013.01)

(58) Field of Classification Search
CPC .................. H04L 43/062; H04L 47/2483
See application file for complete search history.

(56) References Cited

U.S. PATENT DOCUMENTS 10,368,340 B2 * 7/2019 Lu ................. H04N 21/4131
10,375,665 B2 * 8/2019 Li ..................... H04W 48/16
(Continued)

FOREIGN PATENT DOCUMENTS

| KR | 10-2019-0132898 A | 11/2019 |
| KR | 10-2021-0037416 A | 4/2021 |
| WO | 2019184433 A1 | 10/2019 |

OTHER PUBLICATIONS

Sokratis Barmpounaskis et al. "Data Analytics for 5G Networks: A Complete Framework for Network Access Selection and Traffic Steering", International Journal on Advances in Telecommunications, vol. 11 No. 3 & 4, 2018, 14 pages. (Year: 2018).*
(Continued)

*Primary Examiner* — George C Neurauter, Jr.

(57) ABSTRACT

The disclosure relates to a method and apparatus for collecting network traffic in a wireless communication system, and an operation method of a network data analytics function (NWDAF) in a wireless communication system may include obtaining scheduled service usage information of a user equipment (UE), the scheduled service usage information including a service usage identifier for identifying a service used by the UE, information about a scheduled communication time for the service, a correlation identifier associated with a service used in a different time from the scheduled communication time or another UE, and a traffic descriptor, receiving a packet for the service used by the UE from a session management function (SMF), identifying service traffic characteristics from the packet for the service, based on the scheduled service usage information, and transmitting a packet flow description (PFD) to a network exposure function (NEF), based on the identified service traffic characteristics.

14 Claims, 9 Drawing Sheets

(56) References Cited

U.S. PATENT DOCUMENTS

| | | | |
|---|---|---|---|
| 10,637,753 B1* | 4/2020 | Taft | H04L 43/04 |
| 10,911,326 B2 | 2/2021 | Han et al. | |
| 10,986,516 B2* | 4/2021 | Dao | H04W 72/535 |
| 11,140,047 B2* | 10/2021 | Shan | H04L 41/0893 |
| 11,296,959 B2 | 4/2022 | Han et al. | |
| 11,399,293 B2* | 7/2022 | Dao | H04W 72/535 |
| 2019/0356558 A1 | 11/2019 | Han et al. | |
| 2021/0022022 A1 | 1/2021 | Guo et al. | |
| 2021/0235288 A1* | 7/2021 | Dao | H04W 72/535 |

OTHER PUBLICATIONS

International Search Report and Written Opinion of the International Searching Authority dated Mar. 26, 2021, in connection with International Application No. PCT/KR2020/018898, 9 pages.

3GPP TR 23.724 V16.1.0 (Jun. 2019), Technical Specification, 3rd Generation Partnership Project; Technical Specification Group Services and System Aspects; Study on Cellular Internet of Things (CIoT) support and evolution for the 5G System (5GS) (Release 16), Jun. 2019, 274 pages.

3GPP TS 23.502 V16.3.0 (Dec. 2019), Technical Specification, 3rd Generation Partnership Project; Technical Specification Group Services and System Aspects; Procedures for the 5G System (5GS); Stage 2 (Release 16), Dec. 2019, 558 pages.

3GPP TS 29.522 V16.2.0 (Dec. 2019), Technical Specification, 3rd Generation Partnership Project; Technical Specification Group Core Network and Terminals; 5G System; Network Exposure Function Northbound APIs; Stage 3 (Release 16), Dec. 2019, 106 pages.

Supplementary European Search Report dated May 22, 2023, in connection with European Application No. 20911653.2, 7 pages.

3GPP TR 23.700-91 V0.2.0 (Nov. 2019), Technical Report, 3rd Generation Partnership Project; Technical Specification Group Services and System Aspects; Study on Enablers on Network Automation for 5G—phase 2 (Release 17), Nov. 2019, 19 pages.

3GPP TR 23.791 V1.2.0 (Nov. 2018), Technical Report, 3rd Generation Partnership Project; Technical Specification Group Services and System Aspects; Study of Enablers for Network Automation for 5G (Release 16), Nov. 2018, 119 pages.

3GPP TS 23.503 V16.3.0 (Dec. 2019), Technical Specification, 3rd Generation Partnership Project; Technical Specification Group Services and System Aspects; Policy and charging control framework for the 5G System (5GS); Stage 2 (Release 16), Dec. 2019, 112 pages.

* cited by examiner

METHOD AND APPARATUS FOR COLLECTING NETWORK TRAFFIC IN WIRELESS COMMUNICATION SYSTEM

CROSS-REFERENCE TO RELATED APPLICATIONS

This application is a 371 National Stage of International Application No. PCT/KR2020/018898, filed Dec. 22, 2020, which claims priority to Korean Patent Application No. 10-2020-0001575, filed Jan. 6, 2020, the disclosures of which are herein incorporated by reference in their entirety.

BACKGROUND

1. Field

The disclosure relates to a method and apparatus for collecting network traffic in a wireless communication system, and more particularly, to a method of collecting network traffic for detection and analysis of a new application in a wireless communication system.

2. Description of Related Art

To meet the demand with respect to ever-increasing wireless data traffic since the commercialization of the 4th generation (4G) communication system, there have been efforts to develop an advanced 5th generation (5G) or pre-5G communication system. For this reason, the 5G or pre-5G communication system is also called a beyond 4th-generation (4G) network communication system or post long term evolution (LTE) system.

Implementation of the 5G communication system using ultrahigh frequency (millimeter wave (mmWave)) bands, e.g., 60 giga hertz (GHz) bands, is being considered to attain higher data transfer rates. To reduce propagation loss of radio waves and increase a transmission range in the ultrahigh frequency bands, beamforming, massive multiple-input multiple-output (MIMO), full dimensional MIMO (FD-MIMO), array antenna, analog beamforming, and large-scale antenna techniques are under discussion.

To improve system networks, technologies for advanced small cells, cloud radio access networks (RANs), ultra-dense networks, device to device (D2D) communication, wireless backhaul, moving networks, cooperative communication, coordinated multi-points (CoMP), reception-end interference cancellation and the like are also being developed in the 5G communication system.

In addition, in the 5G system, an advanced coding modulation (ACM) method, e.g., hybrid FSK and QAM modulation (FQAM), sliding window superposition coding (SWSC), and advanced access technology, e.g., filter bank multi carrier (FBMC), non-orthogonal multiple access (NOMA), and sparse code multiple access (SCMA) are being developed.

In the meantime, the Internet is evolving from a human-oriented connectivity network where humans generate and consume information to an Internet of things (IoT) network where distributed entities or things send, receive and process information without human intervention. Internet of Everything (IoE) technologies, in which a big data processing technology through connection with a cloud server, for example, are combined with an IoT technology, have also emerged. To implement IoT, various technologies, such as a sensing technology, a wired/wireless communication and network infrastructure, a service interfacing technology, and a security technology are required, and even technologies for sensor networks, machine to machine (M2M) communication, machine type communication (MTC) for connection between things are being studied these days. In the IoT environment, intelligent Internet technology (IT) services that create new values for human life by collecting and analyzing data generated from connected things may be provided. IoT may be applied to a variety of areas, such as smart home, smart buildings, smart cities, smart cars or connected cars, smart grid, health care, smart home appliances and advanced medical services through convergence and combination between existing Information Technologies (IT) and various industrial applications.

In this regard, various attempts to apply the 5G communication system to the IoT network are being made. For example, 5G communication such as a sensor network, M2M, MTC, etc., is implemented by such techniques as beamforming, MIMO, and array antenna, etc. Even application of a cloud radio access network (cloud RAN) as the aforementioned big data processing technology may be an example of convergence of 5G and IoT technologies.

It is expected that the number of available services or applications in a 5G mobile communication system will increase over time and that services requiring high-level quality of service (QoS) such as augmentation reality (AR), virtual reality (VR), ultra-high definition image streaming and three dimensional (3D) streaming will emerge. A prerequisite to effectively supporting operation of such a service or application is to specifically detect the service or application, and to support smooth operation after a specific service or application is detected, a method of identifying and providing a required QoS level is required.

SUMMARY

The disclosure provides an apparatus and method for collecting network traffic in a wireless communication system.

Technological objectives of the disclosure are not limited to the aforementioned features, and throughout the specification it will be clearly appreciated by those of ordinary skill in the art that there may be other technological objectives unmentioned.

Embodiments of the disclosure provide an apparatus and method capable of effectively collecting network traffic in a wireless communication system.

Effects according to the disclosure are not limited thereto, and throughout the specification it will be clearly appreciated by those of ordinary skill in the art that there may be other effects unmentioned.

DETAILED DESCRIPTION

Figure 1:
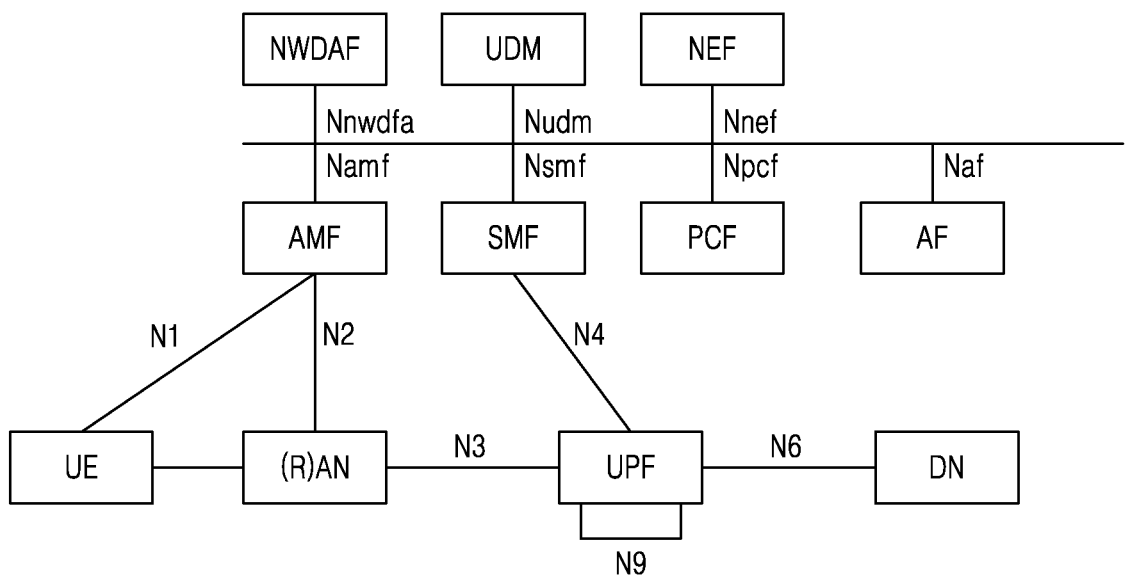
FIG. 1 illustrates a mobile communication system and an application function (AF) located outside a network, according to an embodiment of the disclosure.

According to an embodiment of the disclosure, an operation method of a network data analytics function (NWDAF) in a wireless communication system may include obtaining scheduled service usage information of a user equipment (UE), wherein the scheduled service usage information includes a service usage identifier for identifying a service used by the UE, information about a scheduled communication time for the service, a correlation identifier associated with a service used in a different time from the scheduled communication time or another UE, and a traffic descriptor, receiving a packet for the service used by the UE from a session management function (SMF), identifying service traffic characteristics from the packet for the service, based on the scheduled service usage information, and transmitting a packet flow description (PFD) to a network exposure function (NEF), based on the identified service traffic characteristics.

According to an embodiment of the disclosure, a network data analytics function (NWDAF) in a wireless communication system may include a transceiver, and at least one processor configured to obtain scheduled service usage information of a user equipment (UE) through the transceiver, wherein the scheduled service usage information includes a service usage identifier for identifying a service used by the UE, information about a scheduled communication time for the service, a correlation identifier associated with a service used in a different time from the scheduled communication time or another UE, and a traffic descriptor, receive a packet for the service used by the UE from a session management function (SMF) through the transceiver, identify service traffic characteristics from the packet for the service, based on the scheduled service usage information, and transmit a packet flow description (PFD) to a network exposure function (NEF) through the transceiver, based on the identified service traffic characteristics.

Embodiments of the disclosure will be described in detail with reference to accompanying drawings.

Technological content well-known in the art or not directly related to the disclosure is omitted in the following description. Through the omission of content that might otherwise obscure the subject matter of the disclosure, the subject matter will be understood more clearly.

For the same reason, some parts in the accompanying drawings are exaggerated, omitted or schematically illustrated. The size of the respective elements may not fully reflect their actual size. Like numbers refer to like elements throughout the drawings.

Advantages and features of the disclosure, and methods for achieving them will be understood more clearly when the following embodiments are read with reference to the accompanying drawings. The embodiments of the disclosure may, however, be embodied in many different forms and should not be construed as limited to the embodiments set forth herein; rather, these embodiments of the disclosure are provided so that this disclosure will be thorough and complete, and will fully convey the scope of the embodiments of the disclosure to those of ordinary skill in the art. Like numbers refer to like elements throughout the specification.

It may be understood that respective blocks and combinations of the blocks in processing flowcharts will be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-executable or computer-readable memories oriented for computers or other programmable data processing equipment to function in a particular manner, so it is possible to manufacture a product that contains instruction stored in the computer-executable or computer-readable memories for performing functions described in the block(s) of the flowchart. The computer program instructions may also be loaded on computers or programmable data processing equipment, so it is possible for the instructions to generate a process executed by the computer or the other programmable data processing equipment to provide steps for performing functions described in the block(s) of the flowchart.

Furthermore, each block may represent a part of a module, segment, or code including one or more executable instructions to perform particular logic function(s). It is noted that the functions described in the blocks may occur out of order in some alternative embodiments. For example, two successive blocks may be performed substantially at the same time or the blocks may sometimes be executed in the reverse order, depending upon the functionality involved.

The term "module" (or sometimes "unit") as used herein refers to a software or hardware component, such as field programmable gate array (FPGA) or application specific integrated circuit (ASIC), which performs some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a smaller number of components and modules, or further divided into a larger number of components and modules. Moreover, the components and modules may be implemented to execute one or more central processing units (CPUs) in a device or security multimedia card. In embodiments, the module may include one or more processors.

Although embodiments of the disclosure will be primarily focused on a radio access network, New RAN (NR), and a core network, packet core (5G system, 5G core network, or next generation (NG) core) in a 5G mobile communication standard specified by the third generation partnership project (3GPP), the subject matter of the disclosure may also be applicable to other communication systems with a similar technical background with minor changes without significantly departing from the scope of the disclosure, which may be possible under the determination of those of ordinary skill in the art to which the disclosure pertains.

For convenience of explanation, some of the terms and names defined by the 3GPP long term evolution (LTE) standard (a standard for 5G, NR, LTE or similar system) will be used hereinafter. The disclosure is not, however, limited to the terms and definitions, and may equally apply to any systems that conform to other standards.

Herein, terms to identify access nodes, terms to refer to network entities, terms to refer to messages, terms to refer to interfaces among network entities, terms to refer to various types of identification information, etc., are examples for convenience of explanation. Accordingly, the disclosure is not limited to the terms as herein used, and may use different terms to refer to the items having the same meaning in a technological sense.

The disclosure relates to a method and apparatus for creating and using a rule for detecting a service or application traffic and in a mobile communication system conforming to a 3GPP standard, and apparatuses or objects as will be described later may interact with each other to accomplish the purpose of the disclosure.

Among various elements that make up a core network, devices directly involved in the disclosure will now be described as examples. A diagram illustrating the respective elements interacting with each other using a service based interface is shown in FIG. 1.

According to an embodiment, an access and mobility management function (AMF) is a device for managing access and mobility of a user equipment (UE), and may serve as a UE-core network endpoint for the UE to be able to be connected to other devices in the core network through a radio access network (RAN). Functions provided by the AMF may include e.g., management of registration, connection, reachability and mobility of the UE, access confirmation/authentication, mobility event creation, etc.

In an embodiment, a session management function (SMF) may perform a function of managing a packet data unit (PDU) session of the UE. For example, the SMF may perform session management functions for session establishment, modification, release, or associated tunnel maintenance between a user plane function (UPF) and an access network (AN), functions for IP address allocation and management for the UE, an address resolution protocol (ARP) proxy function, and functions for user plane selection and control, traffic processing control in the UPF, charging data collecting control, etc. With respect to the disclosure, the SMF may perform a role to receive, from a policy control function (PCF), a rule for characterizing traffic it intends to collect and forward the rule to the UPF, and forward a packet received from the UPF to a network data analytics function (NWDAF).

In an embodiment, the PCF may serve to determine and issue a policy for access/mobility and session management to be applied to the AMF and the SMF. For example, the PCF may govern all the behaviors of a network and provide policies to be carried out to network functions (NFs) that make up a control plane. The PCF may also access a unified data repository to access information relating to determining the policy. In the disclosure, the PCF may create a policy and charging control (PCC) rule for allowing packets to be collected to a schedule of traffic received in advance from the AF or an operation, administration and maintenance (OAM). Alternatively, the PCF may create an access and mobility (AM) policy to guide traffic for analysis to be transmitted to a specific slice comprised of separate devices.

In an embodiment, a network exposure function (NEF) may serve to send or receive an event occurring in a mobile communication network and a supporting capability to or from the outside of the mobile communication network. For example, the NEF may perform a function of safely provisioning, to the core network, information about an application outside the core network, conversion of internal/external information, a function of storing a function received from another NF in the UDR and redistributing the function, etc.

Although in an embodiment a united data management (UDM) and the UDR may refer to separate network functions, their functions and roles may be similarly used and simultaneously described in embodiments of the disclosure. The UDM may perform creation of authentication and key agreement (AKA) authentication information for 3GPP security, processing of user identity (ID), unconcealment of subscriber concealed ID (SUCI), management of a list of NFs supporting the current UE, subscription management, short message service (SMS) management, etc. In an embodiment, a concealed subscription permanent identifier (SUPI) may refer to the SUCI. The UDR may perform a function of storing and providing subscription information managed by the UDM, data organized for exposure, or application data associated with an NEF or a service.

In an embodiment, the UPF may serve to process actual user data, forward a packet created by the UE to an external data network, or process a packet to forward data brought in from the external data network to the UE. Main functions provided by the UPF may include e.g., functions of performing an anchor role between radio access technologies (RATs), providing connectivity of a PDU session and an external data network, packet routing and forwarding, packet inspection, user plane policy application, traffic usage report preparation, buffering, et. In addition, the UPF may serve to send a certain packet in relation to the disclosure to the core network.

In an embodiment, the NWDAF may collect events or information occurring in the network, and send the NF, the AF, or the OAM statistics, prediction or recommendation information relating to particular information by using an analysis tool or machine learning tool. For example, the NWDAF may perform a function of collecting data from the NF/AF/OAM, NWDAF service registration and metadata exposure, providing network analytics to the NF/AF, etc. The NWDAF may perform the core role in the disclosure, serving to find a signature commonly included in packets received from the SMF or the UPF by analyzing the packets or analyze and extract statistical characteristics of the packets.

In an embodiment, a UE radio capability management function (UCMF) may serve to store and provide mapping information between an ID of a radio access related function of the UE allocated by a public land mobile network (PLMN) or a manufacturer and an actual function in a dictionary format.

In an embodiment, an application function (AF) may perform a function linked to the 3GPP core network to provide a service. In an embodiment, the AF may be divided into a trusted one and an untrusted one, and the trusted AF may use services of NFs located in the core network without an extra intermediate function such as the NEF. Representative functions provided by the AF may include routing of network traffic preferred by an application (application influence on traffic routing), using a network information exposure function, interaction with a policy framework for policy control, IP multimedia subsystem (IMS) related interaction, etc.

In an embodiment, the OAM may refer to a device for performing management over the overall mobile communication network including a base station (BS) and the core network. For example, the OAM may perform functions related to operation, management, maintenance, provisioning, troubleshooting, etc., of the communication network. Furthermore, the OAM may perform functions of designing functions of the respective BSs or the core network, and monitoring and configuring the respective BSs or the core network to operate smoothly according to the policy. In an embodiment, the OAM may be a concept encompassing all the tools, procedures, etc., related to management, and may not refer to a specific device but may include all the tools, software, procedures, etc., used by a network administrator for administration.

The 3GPP defines a method of providing a virtual private network comprised of specific UEs in a mobile communication network. In an embodiment, the UEs that make up the virtual private network may be located in the mobile communication network or located in the mobile communication network via an external data network, which may be identified using a generic public subscription identifier (GPSI). The GPSI may be used by being converted to a locally used UE ID such as an international mobile subscriber ID (IMSI) or a subscription permanent ID (SUPI).

In addition, in the 5G network, the NWDAF for providing a function of collecting and analyzing information may provide the following services. It is, of course, not limited to the following example.

Analytics subscription service (Nnwdaf_AnalyticsSubscription Service): an event subscription service is to subscribe or unsubscribe an event created by the NWDAF and may be subdivided into methods for receiving an event periodically or in a particular condition satisfied. The analytics subscription service may be referred to as Nnwdaf_AnlayticsSubscription. The Nnwdaf_AnlayticsSubscription service may provide three operations: subscription, unsubscription, and notification.

When a certain NF wants to subscribe (Nnwdaf_AnlayticsSubscription), elements sent by the NF through the NWDAF may be classified into required inputs and optional inputs. In some embodiments, the required inputs may include single network slice selection assistance information (S-NSSAI), an event identifier, and a notification target address, event reporting information. It is, of course, not limited thereto. In some embodiments, the optional inputs may include extra information required for analytics processing, which may include event filter information representatively. It is, of course, not limited thereto.

In an embodiment, for the unsubscription operation (Nnwdaf_AnlayticsSubscription Unsubscribe), the NF may send the NWDAF subscription identifier information as the required input, and the NWDAF may send a message indicating that unsubscription is confirmed as an output to the NF requesting the operation.

In an embodiment, the notification operation (Nnwdaf_AnlayticsSubscription Notify) may refer to the NWDAF notifying an NF successfully subscribing to an event of a specific event periodically or in a certain condition satisfied. In an embodiment, input information required for the notification operation may include an event identifier, a notification target address, an identifier of a network slice instance, load level information of a network slice instance, etc., and may not include required output information. The input information required for the notification operation is not, of course, limited thereto.

Analytics information request service (Nnwdaf_AnalyticsInfo service): the analytics request service may refer to, unlike the event subscription service, a service by which the NF requests analysis on certain information and receives the resultant value as soon as the request is completed. Operations supported by the analytic information request service may include a request and a response. An NF requesting analytic information may send a request for analytics to the NWDAF.

The NF may send the NWDAF load level information of a network slice instance, an analytic ID and additional parameters required for analytics as inputs required for analytic information. On receiving the request from the NF, the NWDAF may transmit an analytic result as a response to the NF. In this case, the response transmitted to the NF may include load information of the requested slice.

Although, according to the 3GPP Rel-15 definitions, only the load information of the network slice instance is considered for the analytic information provided through the service provided by the NWDAF, information provided by the NWDAF in the disclosure is not limited to the load information but may include movement information of the UE, a communication pattern of the UE/service, an expected moving trajectory of the UE/service, an expected UE behavioral parameter, expected QoS or service experience, expected network performance information, etc.

In the 5G mobile communication system, a method of detecting a service or an application may be performed in service data flows (SDFs), and whether a criterion included in an SDF template is met to distinguish between SDFs may be determined. A method used to identify a packet or network traffic in flows in the SDF template may be classified into two. The first one is a method of matching some fields in the packet header by using SDF filters, and the second one is a method of using an application identifier. One SDF may be specified by combining the SDF filters, and information included in the SDF filter may be header information of the packet. The application identifier may specifically refer to an application detection filter (ADF) installed in the UPF. Furthermore, the application identifier has an advantage of allowing a deep packet inspection (DPI) function that detects a certain service by using payload information of a packet that is not to be subject to the SDF filter. However, to detect traffic of a certain service through the application identifier at the UPF, a filter corresponding to the application identifier needs to be installed in the UPF in advance, and a method of generating or updating a filter is in the UPF manufacturer's or network operator's own area.

The aforementioned two methods (e.g., the method of matching some fields in the packet header by using SDF filters and the method of using the application identifier) may both be limited in that a network operator or an AF located outside has to manually establish a rule for detecting a certain service. It may be, however, difficult to expect an occasion when the detection rule is manually established for all services or all the service providers provide such information for the mobile communication system. Hence, services to which the detection method is not applied may need to accept default network performance and quality despite the difference in their characteristics.

The AF may dynamically install an additional application detection filter in the UPF, which may be referred to as the application identifier. Information used in this process may be referred to as packet flow description (PFD). The PFD may be sent to the network through the AF, the OAM, or the NEF. In this case, components of the PFD may include 3-tuple (an address, a port number, a protocol in use) corresponding to a destination, a particular URL, a particular domain name, or whether a particular protocol is used. The PFD may include a PFD identifier for identifying between PFDs, and may be sent to the NEF along with the application identifier mapped thereto. Filter information included in the PFD may be sent to a required SMF through the NEF, and the SMF may install a filter included in the PFD at the UPF to perform a packet detection function. Accordingly, the PFD may be operated in the same way as in the case of using the application detection filter, except that the PFD is information being dynamically receivable from outside through the NEF.

Methods of detecting traffic may be divided largely into three, which may be representatively port based, DPI based, and statistics based traffic detection methods. The port based traffic detection method is a method of using information in an IP header of packets that make up a service flow, and may use 3-tuple of the destination or 5-tuple that considers even a transmit end. This port based traffic detection method corresponds to a method that uses an SDF filter, which is defined by the 3GPP. The header information of the packet has a value that may always be changed in a cloud or multi-access edge computing (MEC) environment that provides a current virtualization environment, so continuity and accuracy in detection of a service flow may not be guaranteed only by referring to the header information. Next, the DPI based one is not a scheme to simply refer to the header information of the packet only, but may refer to a method of detecting a service flow by referring to data in the packet, i.e., payload information. This method has merit of high accuracy by referring to inside of the packet and using various methods for detection, but may require high-level resources and high processing speed in relation to packet detection. Finally, the statistics based service traffic detection method is a method of using statistical characteristics of packets that make up a flow of service, which may refer to a method of detecting a service flow by using a combination of many statistical characteristics such as a size of the packet, an inter-packet arrival time, duration of the flow, a size of the flow, the presence of inter-packet on/off pattern, etc.

To classify traffic by using characteristics of the traffic of the service or application through the aforementioned method, a method of extracting characteristics of the traffic may be required. To extract characteristics the same service or application has in this process, it may be required to collect reference or standard traffic corresponding to the service or application. To match the extracted characteristics of the traffic based on the reference traffic, a method of creating and using an SDF filter or an application detection filter for extracting traffic of a certain service may be used. For devices of the current 3GPP or mobile communication network, only a method of using the created SDF filter or application detection filter is standardized, which does not include a process of extracting and using characteristics of the traffic as a filter. The disclosure may include a method of collecting traffic that becomes a reference of a certain service or application and accordingly, collecting the characteristics to be used as a filter for detecting the same application or service afterward.

The disclosure proposes a method of self-creating PFD by detecting traffic corresponding to a new application or service and using it in the mobile communication network without receiving PFD from an AF located outside the mobile communication network. The disclosure may include a method of automatically performing detection of the service, and analyzing and applying network service quality and performance requirements required by each service. With the application of the method, a network entity in the mobile communication network may not receive a service detection method from an AF located outside the mobile communication network. Accordingly, a procedure for manually configuring PFD may be skipped, efficiency of network operation may be enhanced, and an overall quality level of services may increase.

The disclosure relates to a method of collecting traffic for detection and analysis of a new application in a mobile communication system.

The disclosure relates to an apparatus and method for detecting a certain service or application and analyzing QoS related characteristics by using an NWDAF in a 5G mobile communication system. For this, an embodiment of the disclosure may provide a method of training and estimating the accuracy for the NWDAF to detect a new application or service and classify the detected new application or service.

Embodiments of the disclosure may provide a method of providing required QoS by dynamically detecting various services or applications (hereinafter, services) provided through a mobile communication system. In LTE or 5G mobile communication systems, as a method of detecting a certain service and providing QoS, a method of providing a certain level of QoS only for traffic of a mobile communication operator or a service provider with which a contract is made was used. Traffic of services except for the traffic for which a certain level of QoS may be guaranteed for the certain service may be processed in the network with the best effort. Furthermore, to distinguish provision of additional QoS, use of an abnormal service or traffic occurrence, use of an illegal service, or traffic of a distributed denial of service (DDoS) from normal traffic, a method of detecting traffic of a target application may be required.

The method of detecting the application provided in a 3GPP core network may be classified largely into two. The two methods may include a method of detecting traffic based on address and port information of the traffic and a method of using deep packet inspection (DPI). For example, a method of detecting a service that triggers traffic by identifying a destination address, a protocol in use, or a port number included in header information of the traffic may be used. In addition, a method of detecting the traffic by referring not only to information included in the packet header but to a data payload of the packet may be used in the UPF. To determine a method of detecting the service and processing the traffic of the service, a concept of a service data flow (SDF) and an SDF template for delivering the concept may be used. The SDF refers to a set of packets corresponding to an SDF filter or application identifier included in the SDF template. In addition, the application identifier may refer to a detection filter of a certain application installed in the UPF, and for detecting the certain application installed in the UPF, a method of inspecting the inside of the packet such as DPI may be used. However, a procedure for installing the application detection filter in the UPF and a method of implementing the filter itself may be out of range of the standard defined in the 3GPP. Furthermore, a method in which the UPF may receive an application identifier and packet flow description (PFD) from an AF located outside the mobile communication network through an NEF and use the PFD to detect the application may be used. The PFD may include information about a destination address, a port, a protocol, whether a certain URL is matched, whether a domain name is matched, and a protocol applied. Hence, to detect a new application based on the current mobile communication standard system, a method of detecting a service based on the destination address and the port or detecting an application based on DPI installed in the UPF may be used.

With a change in structure in which a service is provided in a virtualized infrastructure such as a cloud or mobile edge computing or multi-access edge computing (MEC), the address of a server and the number of a port, which provide the service, may be changed over time. Accordingly, because of the change in port number over time, the port based service detection scheme may have a limitation to continuously detecting an application. Furthermore, when an application detection filter provided by a UPF manufacturer is used, there may be a need to receive periodic updates or maintenance on associated software from the UPF manufacturer. This process may incur an extra operation cost. Moreover, more time may be taken to reflect requirements of the network operator for detection of a certain application. Finally, the AF located outside the network may send a certain application detection method in a PFD. However, it may be hard to expect all the service providers to provide PFDs.

The disclosure may include a method of detecting a new application by dynamically using information in the network.

The number of services and applications provided over the mobile communication network increases exponentially over time, so the network quality and performance related requirements for the services may be different. In this case, to provide a certain service with differentiated network quality and performance, the service needs to be detected first and requirements for quality and performance required by the service may be clearly figured out. In the method of providing network quality or performance for a certain service, when a new service or application emerges or a particular static address is not used, it may be difficult or impossible to detect the application and figure out its characteristics. Hence, to provide a differentiation function to provide differentiated network quality or performance for a certain service, there is a need to manually set many parameters.

In embodiments of the disclosure, a method of detecting traffic for each service or application to manage newly emerging services or applications by separating them from other traffic is provided. The existing service traffic detection schemes may be limitedly operated at slow distribution speed in the current service infrastructure environment. To solve this problem, the disclosure provides a method of allowing subsequent traffic to be detected continuously by collecting and classifying traffic in the mobile communication network on its own. With this, a newly emerging application may be self-detected in the mobile communication network. Furthermore, this may enable traffic of the newly emerging application to be quickly distinguished, so that traffic characteristics and requirements of the service may be figured out by analyzing characteristics of the distinguished traffic. Using the information obtained in this way, network service quality requirements required by the newly emerging service may be quickly figured out at an early stage, thereby providing the service smoothly. Moreover, by figuring out characteristics of abnormal traffic or illegal traffic, a method of dealing with damage related to the network early by blocking the traffic or the service may be provided.

In embodiments of the disclosure as will be described below, a method of detecting traffic corresponding to a new application or service, self-creating and using a PFD in a mobile communication network may be provided.

A first embodiment of the disclosure may include a method of collecting packets by using a schedule and slice of a certain service or application.

The embodiment may include a method in which an AF that is aware of a schedule of the UE applying a certain service or application sends information relating to service traffic used at a certain point in time and an SMF or an NWDAF uses the information to collect associated packets. In this procedure, the AF may not need to be the same as an AF that provides the certain service, and even a UE and an AF manufactured for the purpose of collecting the traffic may be used.

The AF may send information relating to the use of a service to the mobile communication core network through the NEF. In this case, the information sent in the disclosure may refer to scheduled service usage information. The scheduled service usage information used in the disclosure may include information as in Table 1. Information first sent by the AF to the mobile communication core network through the NEF may include a service usage identifier used to identify the service usage information sent for the UE to use a certain service, a scheduled communication time, a correlation identifier for association with a service used by another UE or in another time, and a traffic descriptor for identifying the certain service. In this case, the scheduled communication time of the UE may represent a starting point in time of communication or be represented by a time section representing the start and end of communication. In an embodiment, the correlation identifier may refer to an identifier that enables association with traffic of another UE or in another time that uses the same service. Finally, the traffic descriptor is used to characterize the traffic, and may be comprised of an application descriptor including an operating system (OS) application ID related to an application, an IP header descriptor representing a property of a certain IP header, a domain descriptor for determining whether a particular domain such as a fully qualified domain name (FQDN) is included, a non-IP descriptor that may be matched when an Ethernet-like protocol is used instead of an IP protocol, a packet destination data network name (DNN) or connection capability representing a connection function of the UE. The traffic descriptor may use the same traffic descriptor as used in a user route section policy (URSP) defined by the 3GPP.

TABLE 1

| Expected UE Behaviour parameter | Description |
| --- | --- |
| Service Usage information Identifer | Identifies service usage information |
| Scheduled communication time | An expected time to communicate using a target service or application. Could specify a start time or an interval of time to represent start and end time. |

TABLE 1-continued

| Expected UE Behaviour parameter | Description |
| --- | --- |
| Correlation ID | An Identifier to correlated with other scheduled service usage information [optional] |
| Traffic descriptor | Describe the traffic or packet information. Could be consist of Application descriptor, IP header descriptor, Domain descriptor, Non-IP descriptor, DNN, and Connection capability. |

Referring to Table 1, an expected UE behavior parameter in Table 1 may refer to scheduled service usage information sent from an AF to the mobile communication network according to the disclosure. In this case, the expected UE behavior parameter may include a service usage information identifier, a scheduled communication time, a correlation ID, a traffic descriptor, etc. According to an embodiment, the service usage information identifier may refer to an identifier used to identify service usage information. The scheduled communication time may refer to a time section representing a starting point in time of communication or starting and ending points of the communication of the UE. Furthermore, the correlation ID may refer to an identifier for the UE to correlate scheduled service usage information of the UE with another scheduled service usage information, and may be optionally included in the expected UE behavior parameter. Finally, the traffic descriptor is a parameter for representing traffic packet information, and may be comprised of an application descriptor including an OS application ID related to an application, an IP header descriptor representing a property of a certain IP header, a domain descriptor for determining whether a particular domain such as an FQDN is included, a non-IP descriptor that may be matched when an Ethernet-like protocol is used rather than an IP protocol, a packet DNN, connection capability representing a connection function of the UE, etc.

According to an embodiment, the scheduled service usage information may be stored as part of UE subscriber information. Alternatively, the scheduled service usage information may be stored in the UDR but configured to be referred to by using a UE identifier such as an SUPI or GPSI. When the AF or the OAM sends the scheduled service usage information to the NEF for the first time, a target may be limited by the GPSI or external group ID in a target UE or UE group. On receiving the related information from the AF, the NEF may change it to an SUPI, an IMSI or an internal group ID to identify a target UE or UE group for management.

Furthermore, the information may extend and provide the expected UE behavior parameter. Table 2 below represents information included in the expected UE behavior parameter defined by the 3GPP, and Table 3 represents an expected UE behavior parameter extended to include the scheduled service usage information according to the disclosure. Referring to Table 3, the expected UE behavior parameter may be extended to include information of the same level as the scheduled service usage information by adding the correlation ID and the traffic descriptor to the expected UE behavior parameter of Table 2. Table 2 below represents the expected UE behavior parameter defined by the 3GPP. The expected UE behavior parameter standardized and included in Table 2 may include an expected UE moving trajectory, whether the UE is stationary (stationary indication), a communication duration time, a scheduled communication time, whether a battery is equipped and charged (battery indication), a traffic profile, or a scheduled communication type. Detailed description of each parameter is included in Table 2.

TABLE 2

| Expected UE Behaviour parameter | Description |
| --- | --- |
| Expected UE Moving Trajectory | Identifies the UE's expected geographical movement Example: A planned path of movement |
| Stationary Indication | Identifies whether the UE is stationary or mobile [optional] |
| Communication Duration Time | Indicates for how long the UE will normally stay in CM-Connected for data transmission. Example: 5 minutes. [optional] |
| Periodic Time | Interval Time of periodic communication Example: every hour: [optional] |
| Scheduled Communication Time | Time and day of the week when the UE is available for communication. Example: Time: 13:00-20:00, Day: Monday. [optional] |
| Battery Indication | Identifies power consumption criticality for the UE: if the UE is battery powered with not rechargeable/not replaceable battery, battery powered with rechargeable/replaceable battery, or not battery powered. [optional] |
| Traffic Profile | Identifies the type of data transmission: single packet transmission (UL or DL), dual packet transmission (UL With subsequent DL or DL with subsequent UL), multiple packets transmission [optional] |
| Scheduled Communication Type | Indicates that the Scheduled Communication Type is Downlink only or Uplink only or Bi-directional [To be used together with Scheduled Communication Time] Example: <Scheduled Communication Time>, DL only, [optional] |

Referring to Table 2, the parameters except for the expected UE moving trajectory may be optionally included in the expected UE behavior parameter. According to an embodiment, the expected UE moving trajectory may refer to information identifying expected geographical movement of the UE. For example, the expected UE moving trajectory may refer to a planned path of movement.

In an embodiment, the stationary indication of the UE may refer to an indicator for identifying whether the UE is stationary or moving.

In an embodiment, the communication duration time may generally refer to a period of time for which the UE remains in a connection management (CM)-connected state for data transmission. For example, the communication duration time may be 5 minutes.

In an embodiment, the periodic time may refer to a time interval for periodic communication. For example, the UE may perform communication at 1-hour intervals.

In an embodiment, the scheduled communication time may refer to an hour and a day at which communication is available for the user within a week. For example, the scheduled communication time may indicate a period from 13:00 to 20:00 on Monday.

In an embodiment, the battery equipment and charged state indication (battery indication) may include information about a battery of the UE. For example, the battery indication may indicate whether the battery is a rechargeable/replaceable battery or non-rechargeable/non-replaceable battery and whether the battery is supplying power.

In an embodiment, the traffic profile may be used to identify a data transmission type. For example, the data transmission type may include single packet transmission in uplink (UL) or downlink (DL), dual packet transmission in UL with subsequent DL or DL with subsequent UL, or multiple packets transmission.

In an embodiment, the scheduled communication type may indicate whether the scheduled communication type is DL transmission only, UL transmission only, or bi-directional transmission in DL and UL. In an embodiment, the scheduled communication type may be used with the expected communication time. For example, the scheduled communication type may indicate communication using the expected communication time and DL only.

Table 3 below represents the expected UE behavior parameter extended according to the disclosure.

TABLE 3

| Expected UE Behaviour parameter | Description |
| --- | --- |
| Expected UE Moving Trajectory | Identifies the UE's expected geographical movement Example: A planned path of movement |
| Stationary Indication | Identifies whether the UE is stationary or mobile [optional] |
| Communication Duration Time | Indicates for how long the UE will normally stay in CM-Connected for data transmission. Example: 5 minutes, [optional] |
| Periodic Time | Interval Time of periodic communication Example: every hour. [optional] |
| Scheduled Communication Time | Time and day of the week when the UE is available for communication. Example: Time: 13:00-20:00, Day: Monday. [optional] |
| Battery Indication | Identifies power consumption criticality for the UE: if the UE is battery powered with not rechargeable/not replaceable battery, battery powered with rechargeable/replaceable battery, or not battery powered. [optional] |
| Traffic Profile | Identifies the type of data transmission: single packet transmission (UL or DL), dual packet transmission (UL with subsequent DL or DL with subsequent UL), multiple packets transmission [optional] |
| Scheduled Communication Type | Indicates that the Scheduled Communication Type is Downlink only or Uplink only or Bi-directional [To be used together with Scheduled Communication Time] Example: <Scheduled Communication Time>, DL only. [optional] |
| Correlation ID | An Identifier to correlated with other scheduled service usage information [optional] |
| Traffic descriptor | Describe the traffic or packet information. Could be consist of Application descriptor, IP header descriptor. Domain descriptor, Non-IP descriptor, DNN, and Connection capability. |

Table 3 includes parameters resulting from extending the existing parameters defined in Table 2 by adding parameters of the disclosure thereto. For example, for the expected UE behavior parameter defined by the 3GPP in Table 2, a correlation ID and a traffic descriptor may be further added to the expected UE behavior parameter. For example, the correlation identifier may refer to an identifier that enables association with traffic of another UE or in another time that uses the same service. Finally, the traffic descriptor is used to characterize the traffic, and may be comprised of an application descriptor including an OS application ID related to an application, an IP header descriptor representing a property of a certain IP header, a domain descriptor for determining whether a particular domain such as a FQDN is included, a non-IP descriptor that may be matched when an Ethernet-like protocol is used instead of an IP protocol, a packet destination DNN or connection capability representing a connection function of the UE. The traffic descriptor may use the same traffic descriptor as used in a URSP defined by the 3GPP.

The expected UE behavior parameter as described in Table 3 may be included in the expected service usage information of the disclosure. Accordingly, an AF may send the expected service usage information including the expected UE behavior parameter as described in Table 3 to a PCF through an NEF. Using the received expected service usage information, the PCF may then create a URSP rule for the UE expected to use a certain service. This will be described in detail later in connection with FIG. 3.

Figure 2:
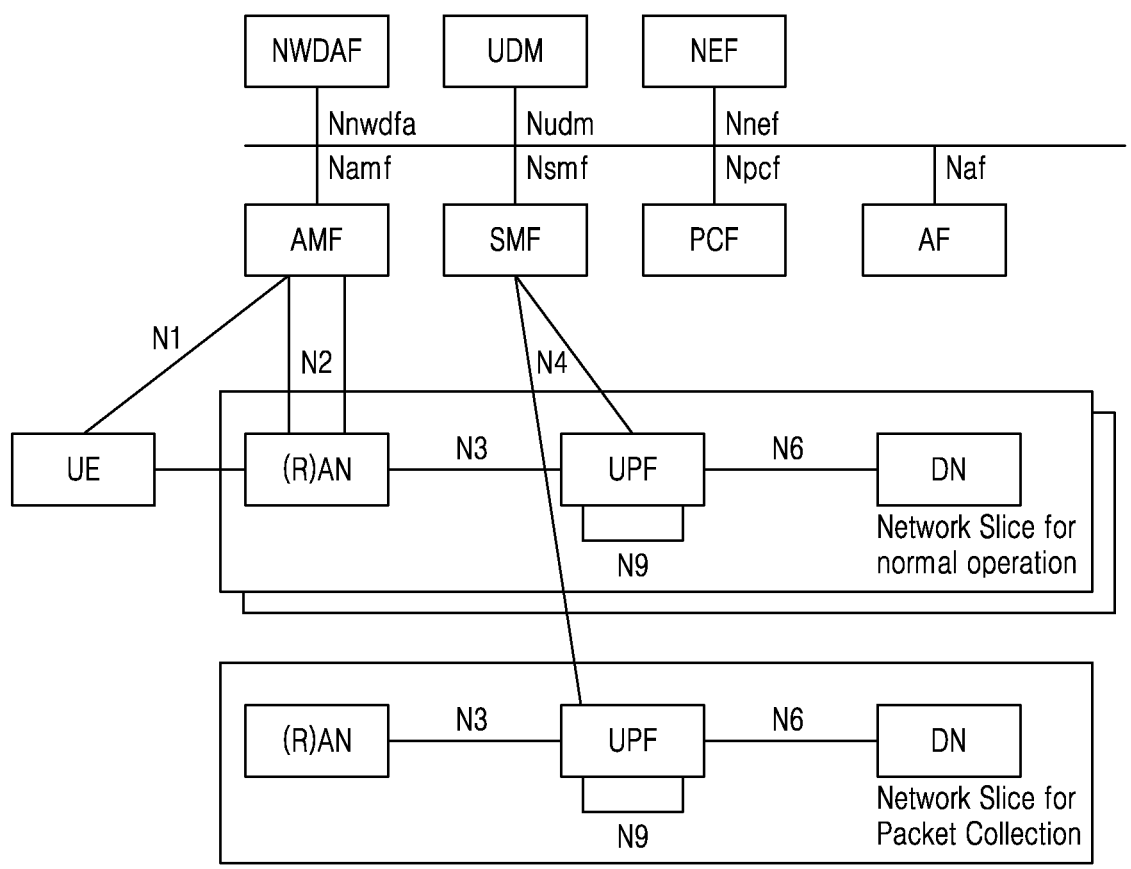
FIG. 2 illustrates an apparatus for collecting packets through a certain slice or a user plane function (UPF), according to an embodiment of the disclosure.

In an embodiment, there may be a UE, a radio access network (RAN), or a UPF as a device located in a path where user traffic is delivered in a 5G mobile communication system. A data network (DN) is configured outside this path of the mobile communication system in which the user traffic is delivered, to forward the user traffic to the destination. In the disclosure, a URSP of the UE may be used to use the aforementioned expected service usage information or the expected UE behavior information extended (hereinafter, referred to as expected service usage information) to enable the traffic corresponding to the expected service usage information to use a slice equipped with extra traffic collecting apparatuses, create a particular PDU session, or deliver the traffic to a particular DN. A network structure for collecting such traffic is illustrated in FIG. 2. FIG. 2 illustrates that a special slice for data collection is configured and certain traffic created by the UE is configured to be sent to the slice. Furthermore, a URSP rule may be created to use a certain DN or a certain PDU session instead of the slice.

According to a URSP defined by the 3GPP, once a PCF creates a related policy and sends it to the UE, the UE may use the rule of the URSP to obtain information such as a DNN for sending certain traffic, slice information (single network slice selection assistant information (S-NSSA)), an SSC mode, a PDU session type, or an access type preference. In addition, information about a valid time and place for the URSP delivered may be delivered.

According to an embodiment of the disclosure, the PCF may use the expected service usage information sent from the AF to create the URSP rule. In this case, a traffic descriptor and a scheduled communication time included in the expected service usage information may be used to define the traffic descriptor and valid time of the URSP. In addition, to guide establishment of a certain slice or certain PDU session, a DNN, an S-NSSAI and PDU session types in the route selection descriptor of the URSP may be set so that defined traffic is sent to the certain slice or data network. For example, when the expected service usage information for UE 1 is sent as (service usage information id=1, correlation id=1, scheduled time=(10:00, 12:00), and traffic descriptor=[(application descriptor=app1)]), a PCF that manages the UE 1 may create a URSP rule as follows. In this case, it may be assumed that a function of collecting packets is available for a slice denoted as NS2. In a case that UE's URSP=[traffic descriptor=[application descriptor=app1], list of route selection descriptor=(precedence=10, route selection component=[network slice selection=NS2]), and Route selection validation criteria=[time window=(10:00, 12:00)], traffic created by app 1 in the UE may be guided to be sent to the NS2.

Figure 3:
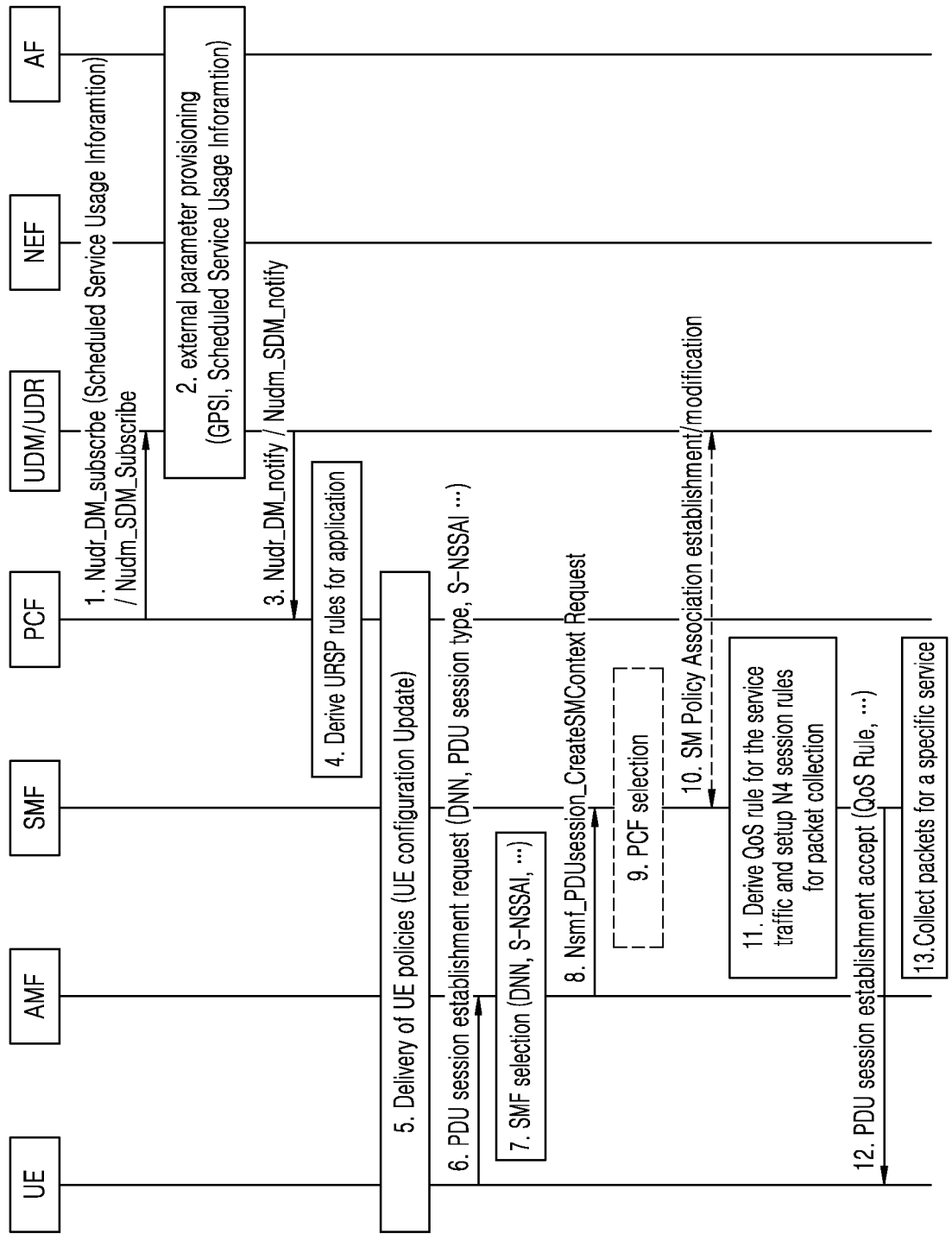
FIG. 3 is a sequence diagram illustrating a procedure for collecting packets of a certain service by using expected service usage information delivered from an AF, according to an embodiment of the disclosure.

A procedure for implementing the disclosure is shown in FIG. 3. FIG. 3 is a sequence diagram illustrating a procedure in which an SMF collects packets of a certain service by using expected service usage information delivered from an AF, according to an embodiment of the disclosure. Hereinafter, a terminal may be referred to as a UE in FIG. 3.

Referring to FIG. 3, in operation 1, a PCF may determine whether the expected service usage information of the UE is delivered, and apply subscription to a UDM or UDR to receive a result of the determining. According to an embodiment, when the expected service usage information is included in subscription information of the UE, the UDM may be used. Alternatively, when reference may be made by using an SUPI, the PCF may request, from the UDR, subscription to related information.

In operation 2, an AF may send scheduled usage information of a certain service from a certain UE or UE group to an NEF. In this case, an interface used for the NEF may be external parameter provisioning, and a GPSI or an external group ID may be used to indicate the certain UE or a UE in a certain group. The NEF may change the GPSI or external group ID to an SUPI or internal group ID and store it before storing related information in the UDM or UDR. According to an embodiment, to store the related information, a method of extending subscription information of the user by adding expected service usage information to the subscription information of the user, or storing it as separate information in the UDR may be used. In this case, an OAM may send the related information instead of the AF.

In operation 3, the UDM or UDR may send the PCF information indicating that the expected service usage information of a certain UE has been delivered to the NEF from the AF.

In operation 4, the PCF may use the received expected service usage information to create a URSP rule for the UE expected to use the certain service. In an embodiment, the URSP rule may enable a DNN or an S-NSSAI to be delivered to the UE in order to deliver packets to a slice or PDU session or data network configured to be able to collect packets of the service. In this case, a traffic descriptor and a valid time section included in the URSP rule may be equal to information received from the expected service usage information.

In operation 5, the PCF may deliver the URSP created in operation 4 to the UE. In this process, a UE configuration update procedure defined by the 3GPP may be used.

In operation 6, traffic corresponding to the URSP may be created in the UE, and the UE may send a request for establishment of a new PDU session to the mobile communication network in order to deliver the traffic. In this case, an S-NSSAI and a DNN included in the request may be determined by the URSP created in the operation 4. In an embodiment, the mobile communication network to which the UE sends the request for establishment of the new PDU session may refer to an AMF.

In operation 7, the AMF may recognize that the traffic created in a certain PDU session is guided to a separate slice, a data network or a certain UPF to collect packets based on the S-NSSAI and the DNN included in the request made in operation 6, and select an SMF for supporting this.

In operation 8, the AMF may forward the PDU session establishment request to the selected SMF. In this case, an Nsmf_PDUSession_CreateSMContext request message may be used.

In operation 9, the SMF may select a PCF to receive a PCC rule related to the traffic. The SMF may select the PCF to create the PCC rule to be able to collect traffic of the service. The PCC rule may enable the particular traffic to be collected from the UPF.

In operation 10, the SMF may establish SM policy association with the selected PCF, and receive the PCC rule to be able to collect packets from the requested PDU session. In an embodiment, to determine whether to collect packets occurring from the certain service, the PCF may receive an associated packet collection request from an OAM in a local policy. Alternatively, when there is an NF from which the SMF requests the related event, the PCF may determine whether to collect packets of the certain service based on the presence of the NF. Furthermore, instead of the PCF, the SMF may determine whether to collect packets as described above.

In operation 11, the SMF may draw a QoS rule for the service traffic, and set up N4 session rules for packet collection. Specifically, the SMF may use the PCC rule received from the PCF to send the QoS rule to the UE and send the NR session rule to the UPF. There may be various methods for collecting packets occurring from a certain service, but in the disclosure, a method of duplicating a packet occurring in the UPF and sending one of the duplicate packets to the SMF may be used by default. To use this method, the packet needs to be duplicated for N4, and a forward action rule (FAR) having a destination interface be the SMF for the one of the duplicate packets to be delivered to the SMF needs to be installed. In operation 11, the SMF may use a basic QoS rule to collect all the packets created in the certain PDU session. In this case, when there are plurality of services, a QoS flow identifier (QFI) may be allocated according to IP header information to allocate a separate QoS flow for each service.

In operation 12, the SMF may send the QoS rule created to the UE.

In operation 13, the SMF may collect packets for the certain service. Specifically, the UPF may send a packet created in the certain PDU session to the SMF, and the SMF may collect the packet.

A second embodiment of the disclosure may include a method of extracting service traffic characteristics from the collected service packet.

The second embodiment of the disclosure may include a method of extracting characteristics of a certain service or application traffic from the collected packets by using the method of collecting the certain service or application packets in the first embodiment. An object from which the service characteristics are extracted in the disclosure may be a packet header, a packet payload, and statistical characteristics of the packet or flow.

In the disclosure, as an entity for extracting such characteristics of a packet or traffic, an NWDAF may be used. Accordingly, the second embodiment of the disclosure may include a method of extracting service traffic characteristics from packets of a certain service or application delivered to the NWDAF. The method according to the second embodiment of the disclosure is shown in FIG. 4.

Figure 4:
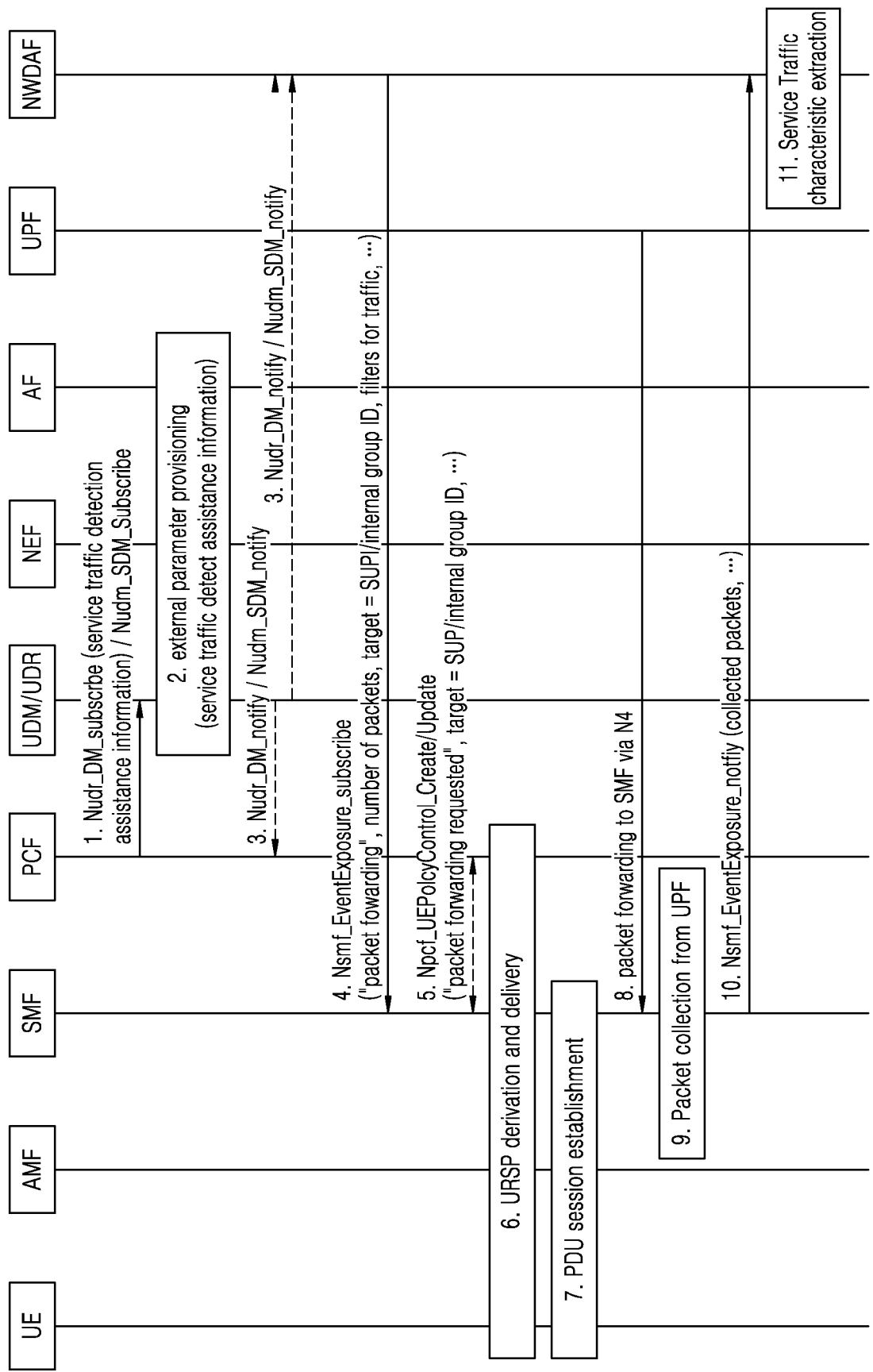
FIG. 4 is a sequence diagram illustrating a procedure in which a network data analytics function (NWDAF) extracts characteristics of certain service traffic by using expected service usage information, according to an embodiment of the disclosure.

FIG. 4 is a sequence diagram illustrating a procedure in which an NWDAF extracts characteristics of certain service traffic by using expected service usage information, according to an embodiment of the disclosure. Hereinafter, a terminal may be referred to as a UE in FIG. 4.

Referring to FIG. 4, in operation 1, a PCF may determine whether the expected service usage information of the UE is delivered, and apply subscription to a UDM or UDR to receive a result of the determining. According to an embodiment, when the expected service usage information is included in subscription information of the UE, the UDM may be used. Alternatively, when reference may be made by using an SUPI, the PCF may request, from the UDR, subscription to related information.

In operation 2, an AF may send scheduled usage information of a certain service from a certain UE or UE group to an NEF. In this case, an interface used for the NEF may be external parameter provisioning, and a GPSI or an external group ID may be used to indicate the certain UE or a UE in a certain group. The NEF may change the GPSI or external group ID to an SUPI or internal group ID and store it before storing related information in the UDM or UDR. According to an embodiment, to store the related information, a method of extending subscription information of the user by adding expected service usage information to the subscription information of the user, or storing it as separate information in the UDR may be used. In this case, an OAM may send the related information instead of the AF.

In operation 3, the UDM or UDR may send the PCF information indicating that the expected service usage information of a certain UE has been delivered to the NEF from the AF. In this case, the expected service usage information may be optionally delivered to an NWDAF.

In operation 4, the NWDAF may transmit a delivery request related to packets to the SMF to collect the packets passing a certain slice or certain UPF. In this case, the SMF, which is a target of the transmission, may be selected by the NWDAF from among SMFs capable of supporting the requesting UE, DNN, S-NSSAI and traffic descriptor. In an embodiment, in requesting an event from the SMF, a packet delivered from the SMF to the UPF may be forwarded to the NWDAF. Furthermore, to define packets to be delivered, the NWDAF may use a UE ID, a DNN, an S-NSSAI, and a traffic descriptor or an event occurrence condition in the SMF. In an embodiment, the event occurrence condition in the SMF may include establishment of a new PDU session and allocation of a new QFI. An entity that requests packet forwarding from the SMF is not limited to the NWDAF, and a different NF than the NWDAF may request packet forwarding from the SMF when required.

In operation 5, the SMF may request UE policy control creation or update from a PCF to perform the packet forwarding request received from the NWDAF. For example, the SMF may request UE policy control creation or update from the PCF to update a URSP for the UE so that the UE may use a certain DNN or S-NSSAI to send a certain packet. In this case, as a trigger of a policy control request, "packet forwarding requested" may be used. In addition, to define the UE, an SUPI of the UE may be delivered, or in a case of a UE group, an internal group ID may be delivered to define the UE group.

In operation 6, when receiving a service request related to the UE policy control from the SMF and "packet forwarding requested" is used as a trigger of the policy control request, the PCF may create a URSP for the UE to collect packets and send the URSP to the UE. This procedure may be performed in the same way as in operations 4 and 5 of the first embodiment.

In operation 7, the UE may establish a PDU session to deliver a newly created packet using the received URSP. This procedure may be performed in the same way as in operations 6 to 12 of the first embodiment.

In operation 8, the UPF may forward packets corresponding to the certain service to the SMF through an N4 session rule received from the SMF.

In operation 9, the SMF may collect packets forwarded from the UPF. The SMF may then store the packets forwarded from the UPF.

In operation 10, the SMF may forward the packet forwarded from the UPF to the NWDAF, which is an NF subscribing to an event related to packet forwarding.

In operation 11, the NWDAF may extract service traffic characteristics. That is, the NWDAF may extract characteristics of the collected packet. In this case, an object from which the NWDAF extracts the packet characteristics may be equal to an object collected from the SMF. Furthermore, the NWDAF may perform analysis on packets having the same correlation ID included in the expected service usage information delivered in operation 2. In this case, the NWDAF may define a set of packets in a certain period of time or having common characteristics as a service flow using operations 1 to 10, and analyze a flow duration time, a transmission or reception data size in the entire flow, an average packet size, average inter-packet arrival time, etc., for the flow. The extracted packet characteristics may include common header information, a common sequence or pattern included in payloads in the packets, or common statistical characteristics of packets or flows. In an embodiment, a reference for the NWDAF to define one flow may be a group of packets representatively having a combination of 5-tuple (a destination address, a destination port number, a sender address, a sender port number, and a protocol) in common. The flow begins from first packet detection, and the NWDAF may define up to a packet last transmitted as one flow when there is no packet transmission for a certain period of time.

A third embodiment of the disclosure may include a method of using the collected packet by registering it to a PFD.

The third embodiment of the disclosure may include a method to enable the same packet occurring in the mobile communication network to be detected by using the characteristics of service traffic extracted as a result of the second embodiment. The traffic characteristics extracted in the second embodiment may be stored in the form of a PFD in the disclosure. In an embodiment, the PFD sent to the NEF may be distributed to the UPF or the SMF through a PDF management procedure defined in the 3GPP standard.

Figure 5:
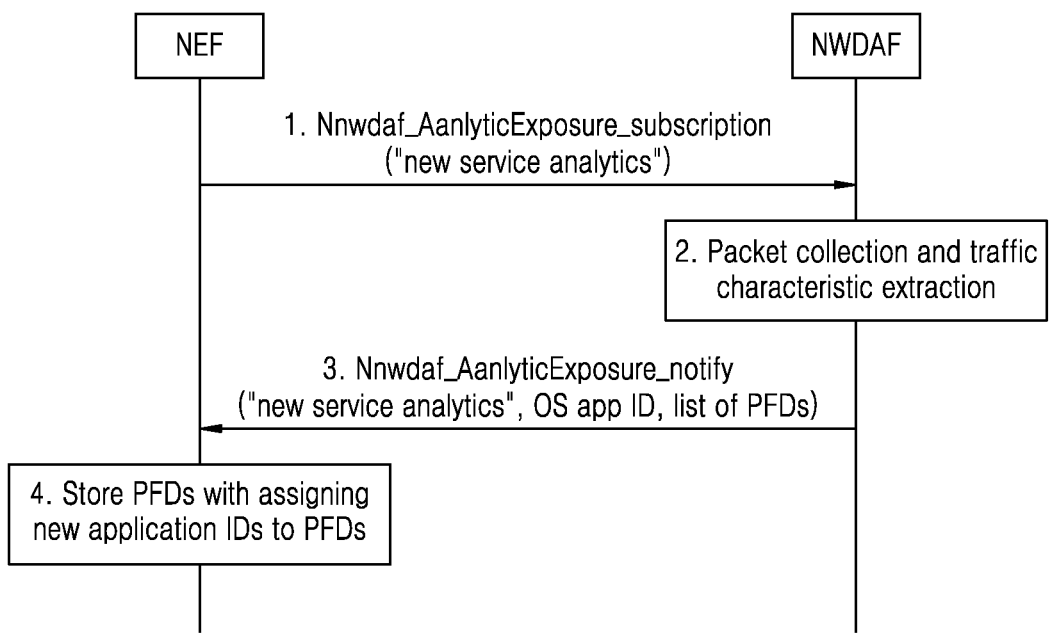
FIG. 5 is a sequence diagram illustrating a procedure for using information of certain service traffic extracted by an NWDAF and delivered to a network exposure function (NEF) as a packet flow description (PFD), according to an embodiment of the disclosure.

The method according to the third embodiment of the disclosure is shown in FIG. 5.

FIG. 5 is a sequence diagram illustrating a procedure for using information of certain service traffic extracted by an NWDAF and delivered to an NEF as a PFD, according to an embodiment of the disclosure.

Referring to FIG. 5, in operation 1, an NEF may request subscription to analytics related to extraction of characteristics of new service traffic from an NWDAF.

In operation 2, the NWDAF may collect packets and extract traffic characteristics. Specifically, the NWDAF may use the method as described in the second embodiment to collect packets of a certain service and extract characteristics of the traffic.

In operation 3, when a newly collected service is not an application possible to be detected before, the NWDAF may send a notification message related to analytics to the NEF. The notification message related to analytics may include information about a PFD for detecting a newly sensed application. In addition, an OS application ID for defining PFDs may be delivered.

In operation 4, the NEF may allocate a new application ID to the PFD and store the PFD. Specifically, when locally determining to use a PFD list and an OS application ID received from the NWDAF as a new PFD, the NEF may allocate and store a new application ID mapped to the PFD. The PFD stored may be sent to the UPF through the SMF.

Figure 6:
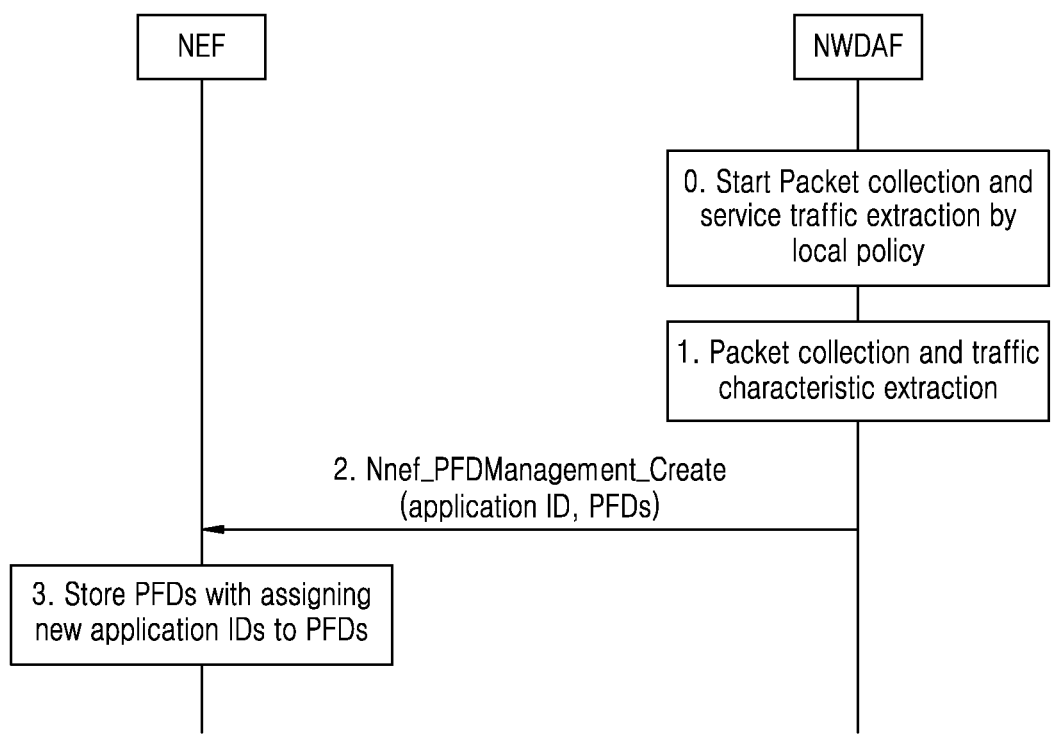
FIG. 6 is a sequence diagram illustrating a procedure in which an NWDAF creates a new PFD by calling a service of an NEF, according to an embodiment of the disclosure.

Another method of delivering the PFD to the NEF is shown in FIG. 6. The biggest difference from the method as shown in FIG. 5 is that the NWDAF calls Nnef_PFDManagement Create or Update from the NEF for the AF.

FIG. 6 is a sequence diagram illustrating a procedure in which an NWDAF creates a new PFD by calling a service of an NEF, according to an embodiment of the disclosure.

Referring to FIG. 6, in operation 0, an NWDAF may start collecting packets and extracting service traffic according to a local policy. For example, the NWDAF may determine to extract characteristics to detect new service traffic according to the local policy.

In operation 1, the NWDAF may perform packet collection and extraction of traffic characteristics. Specifically, the NWDAF may use some embodiments to collect packets and extract traffic characteristics to collect traffic characteristics of a new service and application.

In operation 2, the NWDAF may define characteristics of the new traffic, and when the traffic may not be identified with the existing application identifier, locally allocate a new application identifier and send a PFD for detecting this to the NEF. In this case, Nnef_PFDMagement_create may be used in the service in use. In addition, when an application detection filter connected to the old application identifier needs to be updated, a Nnef_PFDManagement update message may be used, in which case, however, the old application may be used.

In operation 3, the NEF may store the received PFD. The NEF may then forward the received PFD to a UPF through an SMF as required.

A fourth embodiment of the disclosure may include a method of receiving a report of usage of a certain service or application from the UE.

The fourth embodiment of the disclosure may include a method that includes defining the collected traffic on receiving the report related to the service usage from the UE, and collecting characteristics of the traffic. To define the collected traffic, an OS application ID used in the UE may be used or a certain traffic descriptor combination may be used. For example, service traffic may be defined so that traffic occurring from an application, OS application ID=app1, may be detected by the PFD created by the NWDAF, and characteristics may be extracted from target packets.

Figure 7:
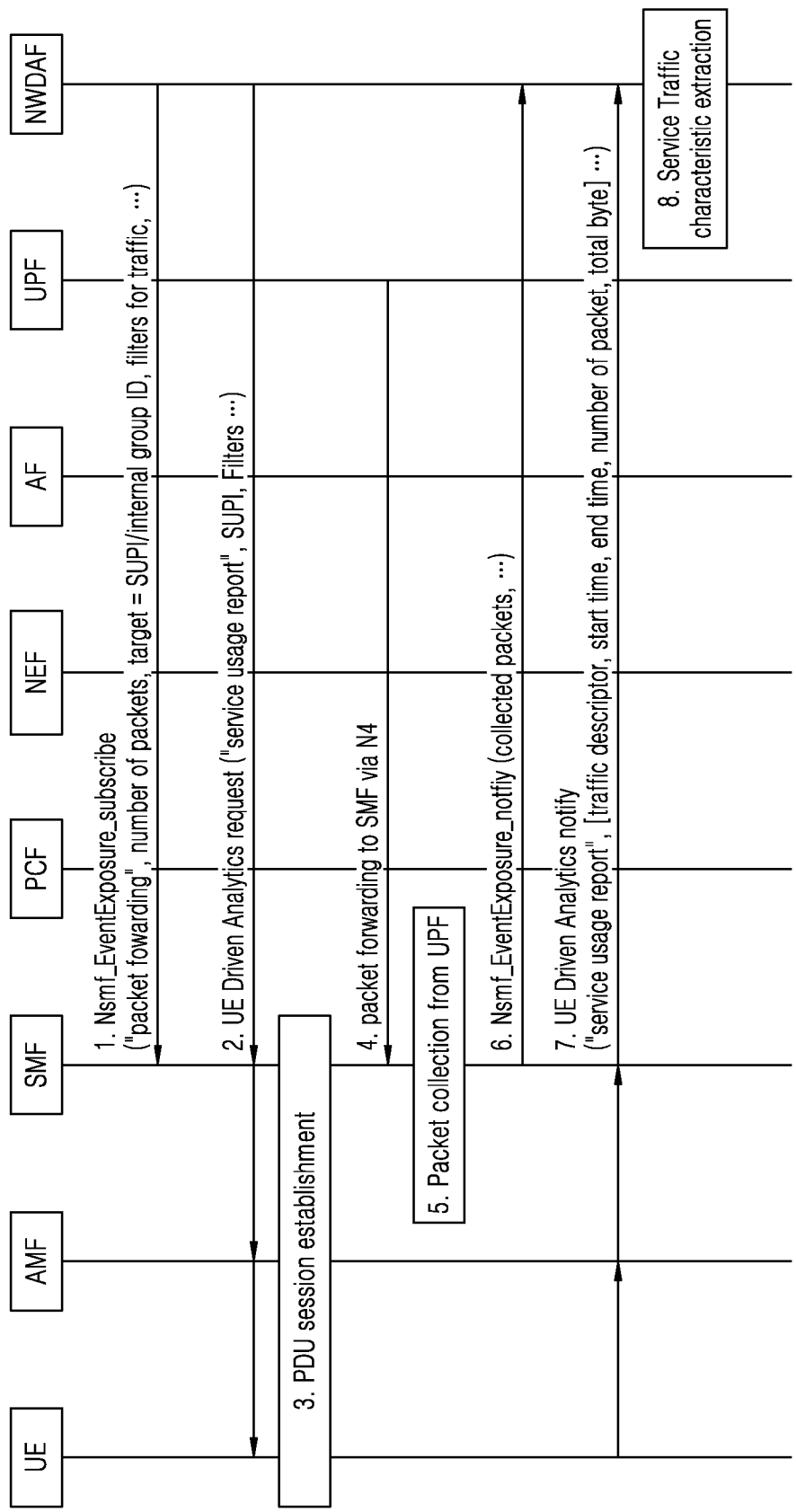
FIG. 7 is a sequence diagram illustrating a procedure in which an NWDAF collects packets occurring in a user equipment (UE), receives associated report information, and thus extracts characteristics of associated traffic, according to an embodiment of the disclosure.

FIG. 7 is a sequence diagram illustrating a procedure in which an NWDAF collects packets occurring in a UE, receives associated report information, and thus extracts characteristics of associated traffic, according to an embodiment of the disclosure.

Referring to FIG. 7, in operation 1, an NWDAF may transmit a delivery request related to packets to the SMF to collect the packets passing a certain slice or certain UPF. In this case, the SMF, which is an entity to which the delivery request related to packets is transmitted by the NWDAF, may be selected by the NWDAF from among SMFs capable of supporting the requesting UE, DNN, S-NSSAI and traffic descriptor. In an embodiment, in requesting an event from the SMF, the NWDAF may receive a packet delivered from the UPF from the SMF. Furthermore, to define packets to be delivered, the NWDAF may use a UE ID, a DNN, an S-NSSAI, and a traffic descriptor or an event occurrence condition in the SMF. In an embodiment, the event occurrence condition in the SMF may include establishment of a new PDU session and allocation of a new QFI. An entity that requests packet forwarding from the SMF is not limited to the NWDAF, and a different NF than the NWDAF may request packet forwarding from the SMF when required.

In operation 2, the NWDAF may request the UE to collect and report information relating to traffic that satisfies a certain condition, in order to collect traffic information from the UE. The request may be created by the NWDAF and sent to the UE through the SMF and the AMF. On receiving the request, when traffic that satisfies the certain condition occurs, the UE may record information relating to the traffic. According to an embodiment, the certain condition may include some of a certain time, a certain place, and a traffic descriptor. The recorded information may include, while the condition is satisfied, a starting time of the condition, an ending time of the condition, the number of packets that have occurred, a total size of the packets that have occurred, an OS application ID of an application that has created the packet, etc.

In operation 3, the UE may establish a PDU session for transmitting traffic and send user data.

In operation 4, the SMF may receive the packet requested in operation 1 from the UPF among packets sent from the UPF.

In operation 5, the SMF may collect packets sent from the UPF.

In operation 6, the SMF may forward the collected packets to the NWDAF.

In operation 7, the UE may report information relating to the traffic occurring within the condition to the NWDAF. In this case, the information to be reported may be sent to the NWDAF through the AMF and the SMF. In an embodiment, the information to be reported may include a starting time of recording, an ending time of recording, the number of packets occurring according to a combination of traffic descriptors, a total amount of use of the packets, etc.

In operation 8, the NWDAF may analyze characteristics of the traffic for each OS app ID based on the traffic usage information received from the UE and information about collected packets. In a subsequent procedure, a PFD may be created and the PFD may be sent to the NEF by using the third embodiment.

Figure 8:
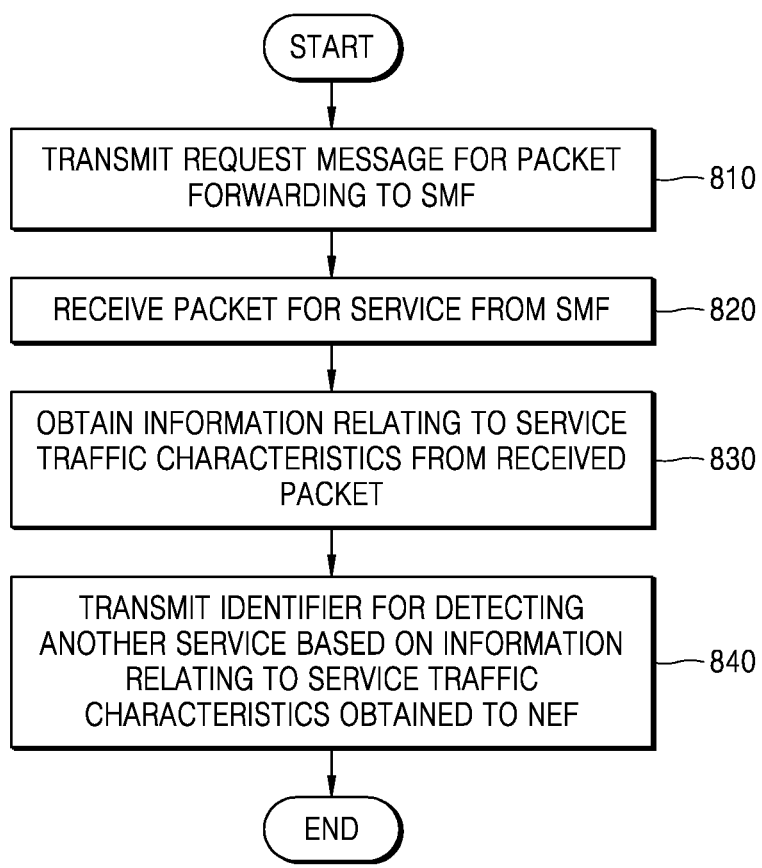
FIG. 8 is a flowchart illustrating an operation method of an NWDAF, according to an embodiment of the disclosure.

FIG. 8 is a flowchart illustrating an operation method of an NWDAF, according to an embodiment of the disclosure.

Referring to FIG. 8, in operation 810, an NWDAF may transmit a request message for service packet forwarding to an SMF. For example, the NWDAF may transmit a delivery request related to packets to the SMF in order to collect the packets passing a certain slice or certain UPF. In an embodiment, the NWDAF may receive packets forwarded to the UPF from the SMF.

In operation 820, the NWDAF may receive packets for a service from the SMF. Although not shown in FIG. 8, the SMF may request UE policy control creation or update from a PCF in order to perform packet forwarding in response to reception of the request message from the NWDAF. After the same operations as operations 6 to 8 of FIG. 4 are performed, the SMF may collect packets forwarded from the UPF. The SMF may then transmit the collected packets to the NWDAF.

In operation 830, the NWDAF may obtain information relating to characteristics of traffic of the service from the received packets for the service. That is, the NWDAF may extract characteristics of the packets received from the SMF.

In operation 840, the NWDAF may transmit an identifier for detecting another service to an NEF based on the information relating to the traffic characteristics obtained. For example, the NWDAF may determine whether the newly collected service corresponds to an existing application that is detectable based on the information relating to the traffic characteristics obtained. In an embodiment, when it is determined that the newly collected service does not correspond to the existing application that is detectable, the NWDAF may transmit a message for detecting the newly sensed application to the NEF. In this case, the message transmitted by the NWDAF to the NEF may include a PFD or an OS application ID to define the PFD.

According to an embodiment of the disclosure, a method of operating an NWDAF in a wireless communication system may include transmitting a request message for forwarding of a packet for a service to an SMF; receiving the packet for the service from the SMF; obtaining information relating to characteristics of traffic for the service from the received packet for the service; and transmitting an identifier for detecting another service based on the information relating to the characteristics of traffic obtained.

According to an embodiment of the disclosure, an operation method of an NWDAF in a wireless communication system may include obtaining scheduled service usage information of a UE, the scheduled service usage information including a service usage identifier for identifying a service used by the UE, information about a scheduled communication time for the service, a correlation identifier associated with a service used in a different time from the scheduled communication time or another UE, and a traffic descriptor, receiving a packet for the service used by the UE from an SMF, identifying service traffic characteristics from the packet for the service based on the scheduled service usage information, and transmitting a PFD to an NEF based on the identified service traffic characteristics.

In an embodiment, the information about the scheduled communication time may include information about a communication time section of the UE which uses the service, and the traffic descriptor may include at least one of an application descriptor related to the service, an IP header descriptor, a domain descriptor, a non-IP descriptor, a DNN of a destination of a packet related to the service, or information about connection capability of the UE.

In an embodiment, the scheduled service usage information may be delivered to the NWDAF from an AF through the NEF.

In an embodiment, the scheduled service usage information may further include an expected behavior parameter of the UE, and the expected behavior parameter of the UE may include at least one of the service usage identifier, the scheduled communication time information, the correlation identifier, or the traffic descriptor.

In an embodiment, the scheduled service usage information may be delivered to a PCF from an AF through the NEF, and
A URSP rule of the UE for collecting packets for the service may be created by the PCF based on the scheduled service usage information.

In an embodiment, a PDU session may be established for the UE based on the URSP rule, and packets for the service used by the UE may be collected by the SMF based on the PDU session.

In an embodiment, the packets for the service may be included in a service flow which indicates a set of packets.

The characteristics of the service traffic may include at least one of common header information of packets included in the service flow, common sequence or pattern information included in internal payloads of the packets, or common statistics characteristics information of the packets.

According to an embodiment of the disclosure, an NWDAF in a wireless communication system may include a transceiver, and at least one processor configured to obtain scheduled service usage information of a UE through the transceiver, the scheduled service usage information including a service usage identifier for identifying a service used by the UE, information about a scheduled communication time for the service, a correlation identifier associated with a service used in a different time from the scheduled communication time or another UE, and a traffic descriptor, receive a packet for the service used by the UE from an SMF through the transceiver, identify service traffic characteristics from the packet for the service based on the scheduled service usage information, and transmit a PFD to an NEF through the transceiver based on the identified service traffic characteristics.

In an embodiment, the information about the scheduled communication time may include information about a communication time section of the UE which uses the service, and
the traffic descriptor may include at least one of an application descriptor related to the service, an IP header descriptor, a domain descriptor, a non-IP descriptor, a DNN of a destination of a packet related to the service, or information about connection capability of the UE.

In an embodiment, the scheduled service usage information may be delivered to the NWDAF from an AF through the NEF.

In an embodiment, the scheduled service usage information may further include an expected behavior parameter of the UE, and
the expected behavior parameter of the UE may include at least one of the service usage identifier, the scheduled communication time information, the correlation identifier, or the traffic descriptor.

In an embodiment, the scheduled service usage information may be delivered to a PCF from an AF through the NEF, and
A URSP rule of the UE for collecting packets for the service may be created by the PCF based on the scheduled service usage information.

In an embodiment, a PDU session may be established for the UE based on the URSP rule, and packets for the service used by the UE may be collected by the SMF based on the PDU session.

In an embodiment, the packets for the service may be included in a service flow which indicates a set of packets.

The characteristics of the service traffic may include at least one of common header information of packets included in the service flow, common sequence or pattern information included in internal payloads of the packets, or common statistics characteristics information of the packets.

Figure 9:
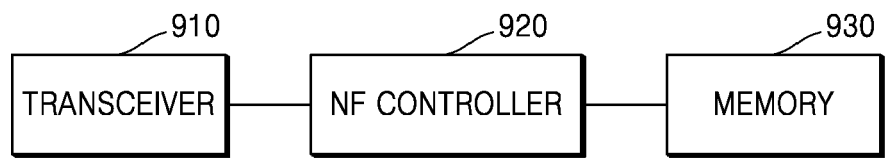
FIG. 9 is a block diagram illustrating a structure of a network function (NF), according to an embodiment of the disclosure.

FIG. 9 is a block diagram illustrating a structure of an NF, according to an embodiment of the disclosure. "Unit", "module", "block", etc., as used herein each represent a unit for handling at least one function or operation, and may be implemented in hardware, software, or a combination thereof. In an embodiment, an NF may refer to a network entity according to the disclosure. For example, the NF may include an AMF, an SMF, a PCF, an NEF, an AF, a UPF, or an NWDAF.

Referring to FIG. 9, the NF may include a transceiver 910, an NF controller 920, and a memory 930. The NF controller 920 will now be defined to be a circuit, an application specific integrated circuit (ASIC), or at least one processor.

The transceiver 910 may transmit or receive signals to or from another network entity, e.g., a UDM and a network node in another core network. Furthermore, the transceiver 910 may provide an interface for communicating with other devices in the network. Specifically, the transceiver 910 may convert a bitstream to be transmitted to another device from the core network object (or a network node) into a physical signal and convert a physical signal received from the other device into a bitstream. That is, the transceiver 910 may transmit or receive a signal. Hence, the transceiver 910 may also be referred to as a modem, a transmitter, a receiver, a communication unit, or a communication module. In this case, the transceiver 910 may allow the core network object to communicate with other devices or systems through backhaul connection (e.g., wired backhaul or wireless backhaul) or other connection methods, or over a network.

The NF controller 920 may control general operation of an NF according to the aforementioned embodiments. For example, the NF controller 920 may control signal flows among the respective blocks to perform operations according to the aforementioned illustrations and flowcharts. That is, the NF controller 920 may control general operations of the NF. For example, the NF controller 920 may transmit or receive a signal through the transceiver 910. The NF controller 920 may record data to the memory 930 or read out data from the memory 930. For this, the NF controller 920 may include at least one processor. The NF controller 920 may control the NF to perform operations according to the aforementioned various embodiments. For example, the NF controller 920 may control the components of the NF to perform a method of collecting network traffic in a wireless communication system according to the disclosure. In an embodiment, the NF controller 920 may refer to a processor and may be called the processor.

The memory 930 may store at least one of information received and for transmission by the transceiver 910 and information generated by the NF controller 920. For example, the memory 930 may store a basic program for operation of the core network object, an application program, and data such as settings information. The memory 930 may include a volatile memory, a non-volatile memory, or a combination of the volatile memory and the non-volatile memory. The memory 930 may provide stored data at the request of the NF controller 920.

Figure 10:
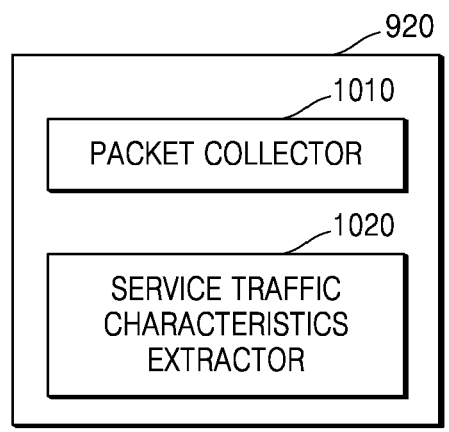
FIG. 10 is a block diagram illustrating a detailed configuration of an NF controller of an NF, according to an embodiment of the disclosure.

FIG. 10 is a block diagram illustrating a detailed configuration of an NF controller of an NF, according to an embodiment of the disclosure. For example, FIG. 10 shows a configuration of the NF controller 920 of FIG. 9.

Referring to FIG. 10, when the NF is an NWDAF, the NF controller 920 may include the components shown in FIG. 10 to perform the embodiments of the disclosure. For example, the NF controller 920 may include a packet collector 1010 and a service traffic characteristics extractor 1020.

The components included in the NF controller 920 (e.g., the packet collector 1010 and the service traffic characteristics extractor 1020 may refer to hardware or software components. When the components are implemented in software, they may be implemented in the form of software modules. Not all but some of the aforementioned components may be included in the NF controller 920.

In an embodiment, the packet collector 1010 may receive a packet collected in a method according to the first embodiment of the disclosure from another network node, or collect a packet on its own.

In an embodiment, the service traffic characteristics extractor 1020 may extract service traffic characteristics from the packet collected in the method according to the second embodiment of the disclosure.

The disclosure relates to a communication scheme and a system employing the same, which integrates an Internet of Things (IoT) technology with a 5th generation (5G) communication system to provide higher data transfer rates beyond the 4th generation (4G) system. The disclosure may be applied to intelligent services based on the 5G communication and IoT related technologies, e.g., smart home, smart buildings, smart cities, smart cars, connected cars, health care, digital education, smart retail, security and safety services.

In the mobile communication system, there may be service traffic to which a service provider or a network operator does not explicitly apply a rule for detecting a certain service and a policy related to performance, quality or charging for the services. Each service traffic has different service quality and performance required, and thus, requirements for network services provided in the mobile communication system may also be different, but there is no method of detecting them, making it difficult to provide differentiated quality and performance.

Embodiments of the disclosure may provide a method of automatically detecting service traffic to which differentiated performance and requirements have hardly been applied. With this, even though the service provider or the network operator does not explicitly manage a service, it may be possible to automatically detect services and automatically apply general performance and quality requirements required by them. Furthermore, a method of distinguishing and detecting a certain service that includes illegal or malicious contents from other services and blocking or restricting use of the service may be applied more easily. With this, overall service quality may be improved, and only a resource required for each service may be allocated. Accordingly, efficiency of the whole network operation may increase.

Methods according to the claims of the disclosure or the embodiments of the disclosure described in the specification may be implemented in hardware, software, or a combination of hardware and software.

When implemented in software, a computer-readable storage medium or computer program product storing one or more programs (software modules) may be provided. The one or more programs stored in the computer-readable storage medium or computer program product are configured for execution by one or more processors in an electronic device. The one or more programs may include instructions that cause the electronic device to perform the methods in accordance with the claims of the disclosure or the embodiments described in the specification.

The programs (software modules, software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), a digital versatile disc (DVD) or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a local area network (LAN), a wide LAN (WLAN), or a storage area network (SAN), or a combination thereof. The storage device may be connected to an apparatus for performing the embodiments of the disclosure through an external port. Furthermore, an extra storage device in the communication network may access a device that performs the embodiments of the disclosure.

In the disclosure, the term 'computer program product' or 'computer-readable recording medium' is used to generally indicate a medium such as a memory, a hard disc installed in a hard disc drive, and a signal. The computer program product or computer-readable recording medium is a means provided for the method of collecting network traffic according to the disclosure.

In the embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

Several embodiments of the disclosure have thus been described, but it will be understood that various modifications can be made without departing the scope of the disclosure. Thus, it will be apparent to those ordinary skilled in the art that the disclosure is not limited to the embodiments described, but can encompass not only the appended claims but the equivalents.

The invention claimed is:

1. An operation method of a network data analytics function (NWDAF) in a wireless communication system, the operation method comprising:
obtaining scheduled service usage information of a user equipment (UE), wherein the scheduled service usage information comprises a service usage identifier for identifying a service used by the UE, information about a scheduled communication time for the service, a correlation identifier associated with a service used in a different time from the scheduled communication time or another UE, and a traffic descriptor;
receiving a packet for the service used by the UE from a session management function (SMF);
identifying service traffic characteristics from the packet for the service, based on the scheduled service usage information; and
transmitting a packet flow description (PFD) to a network exposure function (NEF), based on the identified service traffic characteristics.

2. The operation method of claim 1, wherein the information about the scheduled communication time comprises information about a communication time section of the UE which uses the service, and
wherein the traffic descriptor comprises at least one of an application descriptor related to the service, an Internet protocol (IP) header descriptor, a domain descriptor, a non-IP descriptor, a data network name (DNN) of a destination of the packet for the service, or information about connection capability of the UE.

3. The operation method of claim 1, wherein the scheduled service usage information is delivered to the NWDAF from an application function (AF) through the NEF.

4. The operation method of claim 1, wherein the scheduled service usage information further comprises an expected behavior parameter of the UE, and
wherein the expected behavior parameter of the UE comprises at least one of the service usage identifier, the information about scheduled communication time, the correlation identifier, or the traffic descriptor.

5. The operation method of claim 4, wherein the scheduled service usage information is delivered to a policy control function (PCF) from an AF through the NEF, and
wherein a user route selection policy (URSP) rule of the UE for collecting packet for the service is created by the PCF, based on the scheduled service usage information.

6. The operation method of claim 5, wherein a protocol data unit (PDU) session is established for the UE, based on the URSP rule, and
wherein the packet for the service used by the UE are collected by the SMF, based on the PDU session.

7. The operation method of claim 1, wherein the packet for the service are included in a service flow which indicates a set of packets, and
wherein the service traffic characteristics comprise at least one of common header information of packets included in the service flow, common sequence or pattern information included in internal payloads of the packets, or common statistics characteristics information of the packets.

8. A network data analytics function (NWDAF) in a wireless communication system, the NWDAF comprising:
a transceiver; and
at least one processor configured to obtain scheduled service usage information of a user equipment (UE) through the transceiver, wherein the scheduled service usage information comprises a service usage identifier for identifying a service used by the UE, information about a scheduled communication time for the service, a correlation identifier associated with a service used in a different time from the scheduled communication time or another UE, and a traffic descriptor,
receive a packet for the service used by the UE from a session management function (SMF) through the transceiver,
identify service traffic characteristics from the packet for the service, based on the scheduled service usage information, and
transmit a packet flow description (PFD) to a network exposure function (NEF) through the transceiver, based on the identified service traffic characteristics.

9. The NWDAF of claim 8, wherein the information about the scheduled communication time comprises information about a communication time section of the UE which uses the service, and
wherein the traffic descriptor comprises at least one of an application descriptor related to the service, an Internet protocol (IP) header descriptor, a domain descriptor, a non-IP descriptor, a data network name (DNN) of a destination of the packet for the service, or information about connection capability of the UE.

10. The NWDAF of claim 8, wherein the scheduled service usage information is delivered to the NWDAF from an application function (AF) through the NEF.

11. The NWDAF of claim 8, wherein the scheduled service usage information further comprises an expected behavior parameter of the UE, and
wherein the expected behavior parameter of the UE comprises at least one of the service usage identifier, the information about scheduled communication time, the correlation identifier, or the traffic descriptor.

12. The NWDAF of claim 11, wherein the scheduled service usage information is delivered to a policy control function (PCF) from an AF through the NEF, and wherein a user route selection policy (URSP) rule of the UE for collecting packet for the service is generated by the PCF, based on the scheduled service usage information.

13. The NWDAF of claim 12, wherein a protocol data unit (PDU) session is established for the UE, based on the URSP rule, and wherein the packet for the service used by the UE are collected by the SMF, based on the PDU session.

14. The NWDAF of claim 8, wherein the packets for the service are included in a service flow which indicates a set of packets, and wherein the service traffic characteristics comprise at least one of common header information of packets included in the service flow, common sequence or pattern information included in internal payloads of the packets, or common statistics characteristics information of the packets.

* * * * *